United States Patent [19]

Shipman et al.

[11] 4,006,633
[45] Feb. 8, 1977

[54] METHOD AND APPARATUS FOR DETERMINING HEAT REMOVAL FROM A CONTINUOUS CASTER

[75] Inventors: Johnson Shipman; Herbert L. Gilles, both of Bethlehem, Pa.

[73] Assignee: Bethlehem Steel Corporation, Bethlehem, Pa.

[22] Filed: Apr. 22, 1976

[21] Appl. No.: 679,117

[52] U.S. Cl. .................................. 73/190 H; 164/4; 164/154
[51] Int. Cl.² ................ G01K 17/06; B22D 11/124
[58] Field of Search ........... 73/15 R, 190 R, 190 H, 73/193 R; 164/4, 154, 283 M

[56] References Cited

UNITED STATES PATENTS

| | | | |
|---|---|---|---|
| 3,267,726 | 8/1966 | Sellers | 73/190 |
| 3,478,808 | 11/1969 | Adams | 164/4 |
| 3,923,091 | 12/1975 | Dorv et al. | 164/4 |

*Primary Examiner*—Herbert Goldstein
*Attorney, Agent, or Firm*—Joseph J. O'Keefe; John I. Iverson; George G. Dower

[57] ABSTRACT

Heat removal in a continuous metal casting machine may now be gauged by new normalized thermal parameters instead of the conventional coolant temperature differential parameter. One new thermal parameter is caster mold heat removal rate per unit length of peripheral mold face. This enables a direct comparison of mold sizes and designs. A second new parameter is mold face specific heat removal as a function of the first new parameter and casting speed. The second new parameter is indicative of strand skin growth without actually measuring skin thickness. Third and fourth new parameters are derived by independently ratioing the first and second new parameters so as to reference to a base mold face with the other mold faces. All of the new thermal parameters may also be used to gauge heat removal from caster spray cooling and roll cooling zones. Instrumentation is provided for computing the new thermal parameters during caster operation.

24 Claims, 5 Drawing Figures

METHOD AND APPARATUS FOR DETERMINING HEAT REMOVAL FROM A CONTINUOUS CASTER

BACKGROUND OF THE INVENTION

1. Field of the Invention

This invention relates broadly to continuous metal casting. More particularly, this invention relates to a method and apparatus for determining heat removal from a continuous caster during caster cooling operations. The invention may be used in connection with caster mold heat removal, as described below, as well as with spray cooling and roll cooling zones throughout the caster.

2. Description of the Prior Art

Continuous casting machines are used in the basic metals industry to continuously produce semifinished billets, slabs and the like from molten metal in a one-step solidification process. Generally, molten metal from a tundish is continuously introduced into a water-cooled mold where initial solidification takes place in the form of a frozen metal skin surrounding a liquid core as the cast product continuously leaves the mold. Complete solidification of the cast product occurs in spray cooling, roll cooling and radiation cooling zones beyond the caster mold.

In order to have successful caster operation, a precise amount of initial solidification or skin growth must continuously occur in the caster mold in relation to caster speed. If too much heat is removed from the mold, surface cracks and internal defects may develop in the strand. If too little heat is removed from the mold, a breakout of molten metal will occur in the caster which may result in serious consequences to both personnel and facilities. A key parameter for successful caster operation is knowledge of heat removal in the water-cooled mold. For any mold face of known properties the heat removal rate Q is proportional to the variables of cooling water flow rate W and the cooling water inlet to outlet temperature rise $\Delta T$ in degrees F., and the constants K and Cp which pertain to coolant density and specific heat. Current practice used by most caster operators is to simply gauge mold heat removal by the value of cooling water temperature rise $\Delta T$.

The current practice of using mold $\Delta T$ gauging approach has several deficiencies. For example, assume that during a steady state operation the heat removal rate Q is constant, then $\Delta T$ will be inversely proportional to the water flow rate W. Therefore, changes in water flow rate W, which occur in actual practice, would change the $\Delta T$, thereby indicating a possible heat removal problem which in fact would not exist.

Another deficiency is attributed to the fact that many casters have adjustable molds which are designed with differing amounts of cooling water flow rates per unit length of mold face. For example, a 10 inches mold narrow face may have twice as much flow as a 10 inches section of a mold wide face. Assuming the same heat fluxes on these two mold faces, the $\Delta T$ on the narrow face would be half the $\Delta T$ on the wide face. Thus, using $\Delta T$ as a guide to heat removal in this situation makes comparison between types of mold faces difficult.

In still another situation which deals with adjustable width and thickness caster molds, both the size of the face plates and the cooling water flow rate W are fixed for a given mold. However, when the width or thickness of the cast product is selected from a plurality of mold sizes in one adjustable mold and the cooling water flow rate W is constant, both the heat removal rate Q and the $\Delta T$ will vary with cast product width and/or thickness. Thus, using $\Delta T$ as a measure of heat removal rate again becomes very difficult because any standardized operating practice using $\Delta T$ must then include variations for a plurality of different cast product sizes for each different adjustable mold.

The same deficiencies resulting from using $\Delta T$ for gauging heat removal from the mold apply to the caster spray cooling and roll cooling zones as well.

SUMMARY OF THE INVENTION

One of the objects of this invention is to provide an improved method and apparatus for continuously casting metal which will overcome the foregoing deficiencies.

Another object of this invention is to provide an improved method and apparatus for determining heat removal rates in a continuous metal caster.

Still another object of this invention is to provide an improved method and apparatus for determining heat removal rates, and specific heat removal if desired, in a continuous caster which are independent of variations in water flow rate, design of water passages, and size of cast product in a variable width and/or thickness casting machine.

Yet another object of this invention is to provide a method and apparatus for producing normalized heat removal parameters for a continuous caster which permit direct comparison of heat removal rates between all faces of a caster mold, and/or all spray cooling and roller cooling zones of the caster.

The foregoing objects are attainable by computing new thermal parameters QL, QLR, QA and/or QAR for the face(s) of the continuous metal caster mold, spray cooling and roller cooling zones. As applied to caster molds, QL is a mold heat removal rate parameter computed in a normalized form of BTU/min. per inch of mold face as a function of mold cooling water flow rate W, cooling water temperature rise °F., specific heat of water, and the dimension of mold face in inches. QA is a mold specific heat removal parameter computed in a normalized form of BTU/in.$^2$ as a function of QL and casting speed S. QLR and QAR parameters are computed by ratioing the respective QL and QA parameters of a reference mold face with corresponding parameters of the other mold faces. In this way, all of the new thermal parameters include an "L" dimension and are on a well defined and comparable basis. That is, they are independent of variations in water flow rate, design of water passage, and strand size in a variable width or thickness mold, thereby enabling a direct comparison of different size molds. It will be apparent that only parameters QL and QA may be used in a caster where a comparative basis of wall thermal parameters by ratioing is not desired. As applied to caster spray cooling and roller cooling zones, all of the new thermal parameters also include an L dimension related to strand width and are also on a well defined and comparable basis. This enables a direct comparison of heat removal per unit width of strand for the same spray cooling and roller cooling systems.

DESCRIPTION OF PREFERRED EMBODIMENTS CASTER MOLD COOLING

Figure 1:
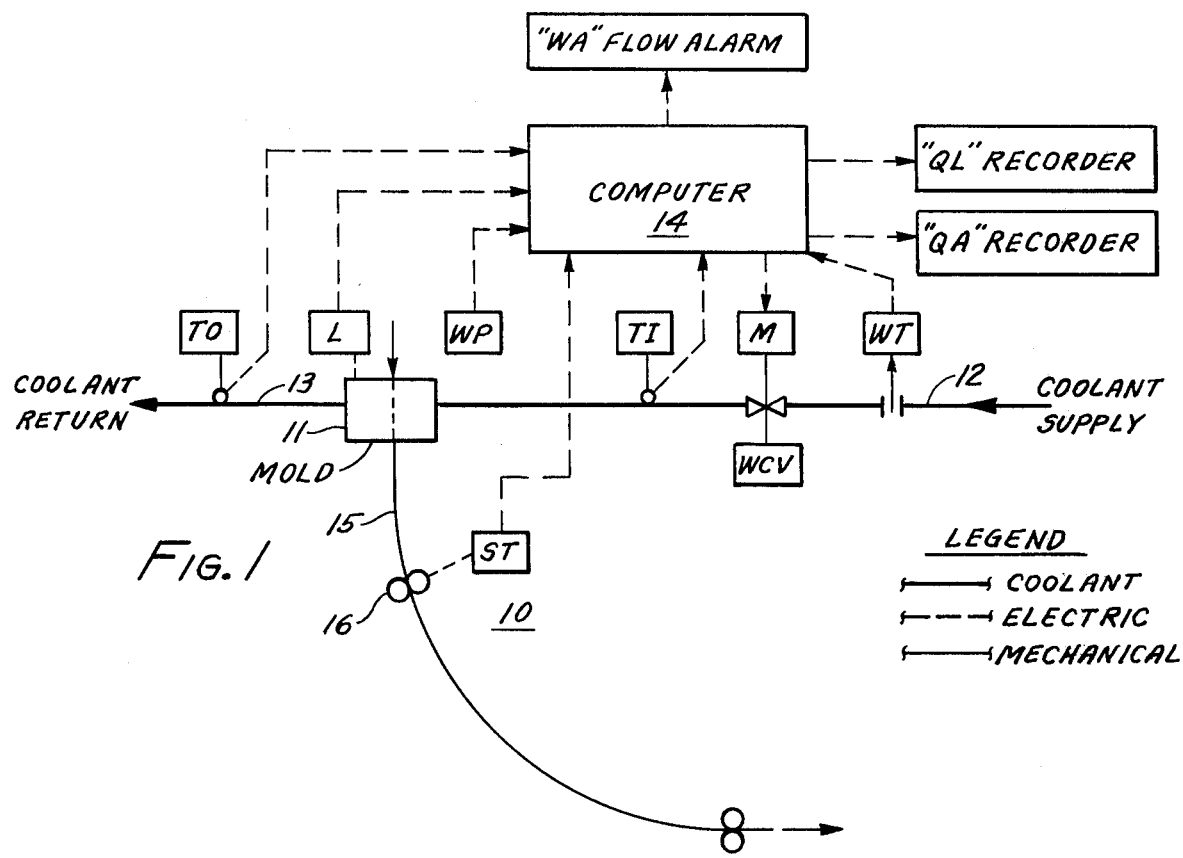
FIG. 1 is a block diagram of a continuous metal caster having a fixed-size mold with a variable cooling system in which the present invention is incorporated without thermal parameter ratioing and without illustrating spray and roller cooling facilities below the mold.

Reference to the invention will be exemplified as determining heat removal from a caster mold. FIG. 1 shows a broad embodiment of the present invention for determining only the new mold heat removal rate QL and the new mold specific heat removal QA of the four new thermal parameters noted above. This is carried out in a conventional continuous metal caster 10 having, for example, an interchangeable fixed-size mold 11 piped to coolant supply and return manifolds 12 and 13, respectively. Coolant flow through mold 11 is regulated by flow control valve WCV, in a manner predetermined by computer 14, whereby molten metal fed from a tundish (not shown) into the top of mold 11 will solidify sufficiently to form cast strand 15 as it leaves mold 11.

The mold cooling system is instrumented with sensors and preset devices placed at locations shown in FIG. 1. Sensors and preset devices are of the conventional industrial grade and generally produce an analog signal that varies with the value of the parameter measured or the actual setting of the preset devices. Sensors include coolant flow rate transmitter WT which may be of the pressure differential type having a non-linear output signal that follows the square law. Coolant flow rate preset device WP will be referred to hereinafter as an operator preset manual loader having an output signal proportional to desired coolant flow rate. Coolant flow rate preset device WP is preset manually according to well known procedures involving grade to be cast and expected tundish temperature and caster speed. Alternatively, preset device Wp may be a separate but unidentified computer arranged to provide an initial preset signal WP which may be updated during casting as actual values of tundish temperature and caster speed, and other parameters, become available.

Additional sensors associated with the mold cooling system measure mold coolant inlet and outlet temperature TI and TO, respectively, which may be thermocouples placed in wells in coolant manifolds 12 and 13. Mold size sensor L, such as an operator preset thumbwheel switch, provides a signal representing the perimeter face dimension of mold 11 and may be changed when mold size is changed to vary the size of cast strand 15. When the new mold specific heat removal QA is to be determined, strand speed is required and is sensed by speed transmitter ST which is driven by caster roll 16.

Figure 2:
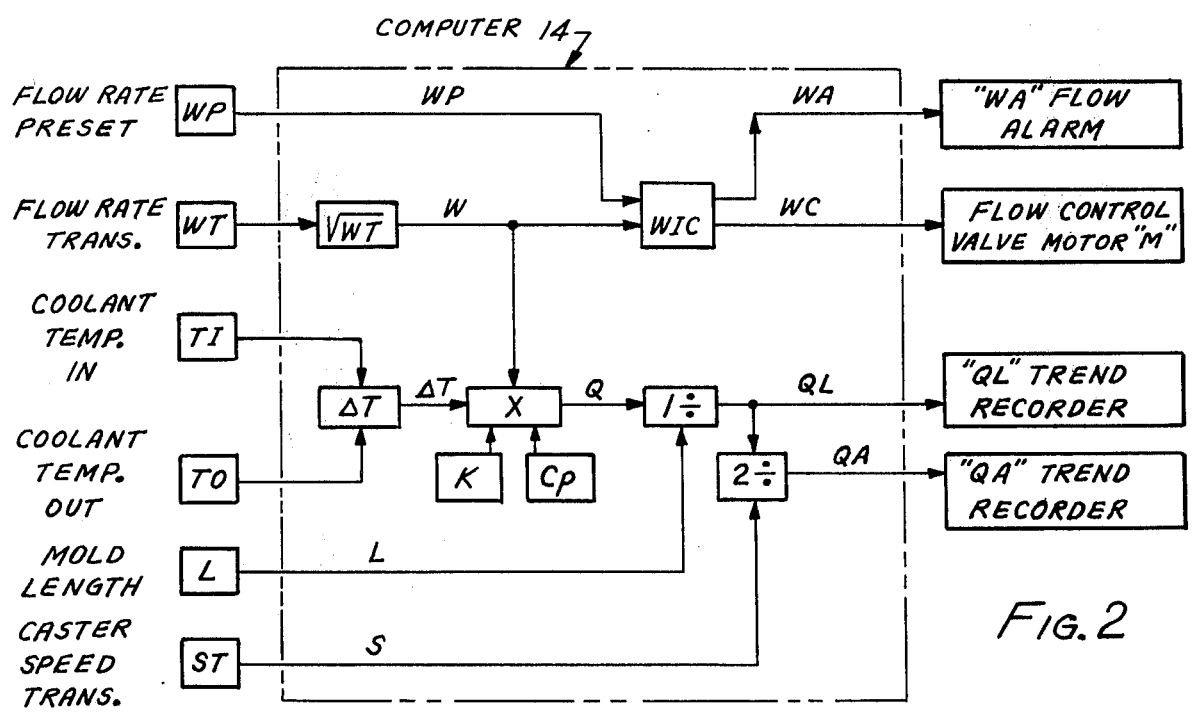
FIG. 2 is an instrumentation diagram showing measurement, control and interconnecting computer components of the fixed-size mold cooling system illustrated in FIG. 1, the same diagram being applicable to spray and roller cooling systems as well.

All of the output signals from sensors WT, TI, TO, L, ST, and preset device WP are fed to computer 14 which is shown in FIG. 2 and described below. Computer 14 assimilates the sensor and preset signals and produces the new thermal parameter signals in addition to a coolant flow control signal WC. This flow control signal is fed to motor operator M on flow control valve WCV and subsequently regulates the amount of heat removed from the molten metal by mold 11. Computer 14 also calculates the new thermal parameters QL and QA and feeds corresponding signals to QL and QA trend recorders. The QL and QA records may be observed by caster 10 operator and compared with desired traces for a given set of operating conditions. Likewise, these records may be used to compare the performance of any mold size or design against another. In addition, the QL and QA signals may be logged on a data logger (not shown) for after-the-cast analysis.

Turning now to FIG. 2, computer 14 instrumentation is exemplified by an assembly of conventional analog-type computer and control components such as are found in a Foxboro Spec 200 analog computer. It will be apparent to those having ordinary skill in the art that a programmed digital computer may be substituted for the analog computer. Regardless of its specific structure, computer 14 is arranged to calculate the new heat removal rate and specific heat removal parameters QL and QA by solving the following equations:

$$QL = \frac{BTU}{MIN - IN} = \frac{W \times \Delta T \times K \times Cp}{L}, \quad \text{Eq. 1}$$

(or in S.I. units)

$$QL = \frac{KCAL}{MIN - CM} = \frac{W \times \Delta T \times K \times Cp}{L} \quad \text{where:} \quad \text{Eq. 1a}$$

$W$ = coolant flow rate, GPM (l/Min.)
$\Delta T$ = coolant temperature rise, °F. (°C.)
$K$ = constant = 8.33 lbs. per gal.
  (1.0 grams per ml.)
$Cp$ = specific heat, BTU/lb. per °F. = 1.0,
  (CAL/GM per °C = 1.0)
$L$ = dimension of mold face, inches (cm.), and $$QA = \frac{BTU}{IN.^2} = \frac{BTU}{MIN - IN.} \times \frac{1}{S} = \frac{QL}{S}, \quad \text{Eq. 2}$$

(or in S.I. units)

$$QA = \frac{KCAL}{CM^2} = \frac{KCAL}{MIN - CM.} \times \frac{1}{S} = \frac{QL}{S}, \quad \text{where:} \quad \text{Eq. 2a}$$

$QL$ = heat removal rate per unit length of mold face from Eq. 1,
$S$ = speed of cast strand leaving mold, inches/min. (CM min.)

QA is the specific heat removal parameter and indicates the heat extraced per unit area from the face of cast strand 15 including superheat, heat of fusion and sensible heat below solidification. More importantly, QA is an indication to the operator of caster 10 of the amount of solidification or skin growth of cast strand 15 that occurs in mold 11 without requiring a direct measurement of skin thickness.

In order to solve Equations 1 or 1a, computer 14 is provided with coolant flow indicating controller WIC which receives the desired coolant flow rate signal from preset device WP and acts in an automatic flow control loop to provide a coolant flow control signal WC. The WC signal is fed externally to the motor operator M on coolant flow control valve WCV which initially opens this valve wide until a feedback signal is generated externally by coolant flow rate transmitter WT. The WT signal varies according to the square law and is received in computer 14 by square root converter $\sqrt{WT}$ which develops a linear coolant flow rate signal W. If the WT signal were linear, then the square root converter could be eliminated. In either event, the linear feedback signal W is summed in proper proportion with the WP signal at a junction of the input of WIC. This causes the WC signal to tend to close WCV to initially establish the desired coolant flow rate preset by the WP signal and thereby stabilize the flow control loop at the value of WP. If a subsequent change occurs in the WT signal, such as by coolant line pressure changes, the WC signal simply becomes an error signal $\Delta$WC which operates on WCV in the automatic flow control loop to minimize the effects of $\Delta$WC and maintain the desired coolant flow rate W.

Coolant flow indicating controller WIC also detects predetermined upper and lower flow rate limits and produces corresponding coolant flow alarm signals WA. These signals are fed externally to WA flow alarms for alerting the operator of caster 10, or alternatively, to a data logger (not shown) for after-the-cast analysis.

Computer 14 is also provided with circuitry for calculating the conventional mold heat removal rate Q by means of multiplier X, temperature differential device $\Delta$T, and two adjustable constant signal sources K and Cp. A $\Delta$T signal is developed by differencing the external coolant inlet and outlet temperature signals TI and TO respectively, in device $\Delta$T. Proper proportions of the $\Delta$T and W signals are multiplied in multiplier X along with the constants K and Cp signals to produce a heat removal rate signal Q. When water is used as the mold coolant, constant K source is adjusted so that the K signal will equal 8.33 lbs. per gal. (1.0 gram per ml.). If a different coolant is used, the K source should be set at a predetermined value corresponding to the other coolant. Constant Cp source is adjusted so that the Cp signal will equal 1.0 BTU/lb. per °F. (1.0 CAL/GM per °C.) if the coolant is water.

The calculated heat removal rate signal Q from multiplier X is divided in computer 14 by the external mold face peripheral length signal L by means of divider 1$\div$. This produces the new normalized heat removal rate QL signal in terms of BTU/min./inch (KCAL/min./cm.) of mold face. Inasmuch as the QL signal is normalized, it represents mold 11 heat removal rate directly without requiring further signal processing in order to be useful. This is true regardless of mold size or other mold cooling characteristics, and regardless of variations occurring at any time in any combination of the WP, W, $\Delta$T, K, Cp and/or L signal sources.

The normalized QL signal is fed to QL trend recorder where the operator of caster 10 may visually observe the QL trace. Based on his knowledge of present operating conditions and his analysis of the QL trace, the operator may determine at any time if the proper normalized heat removal rate occurs in the pesent or any other size or design of mold 11. This may be done without having to convert to other parameters before being able to make such determinations as in the conventional $\Delta$T method of determining mold heat removal rate. In addition, the normalized QL record may be used to make a direct comparison between molds of various designs, thereby enabling the caster operator to choose which mold 11 design will meet his particular operating requirements.

The solution of Equation 2 or 2a, when desired to produce the new normalized QA signal, is achieved by modifying computer 14 to include divider 2$\div$. The calculated normalized QL signal derived from solving Equation 1 is divided in 2$\div$ divider by the caster speed signal S which computer 14 receives from external speed transmission ST. This yields the new specific heat removal parameter QA signal which varies in terms of BTU/IN.$^2$ (KCAL/cm.$^2$) of mold face and the speed of cast strand 15. Inasmuch as the QA signal is normalized, it represents mold 11 specific heat removal directly without requiring further signal processing in order to be useful in determining skin growth of strand formation in mold 11. This is true regardless of mold size or other mold cooling characteristics, and regardless of variations occurring at any time and in any combination of the normalized heat removal rate QL and caster speed signal sources during casting. Thus, the value of QA is always an accurate indication of skin growth without measuring skin thickness, even though caster speed may vary during caster operation.

The normalized QA signal is fed to QA trend recorder where the operator of caster 10 may visually observe the QL trace. Based on his knowledge of present operating conditions and his analysis of the QA trace, the operator may determine at any time if the proper specific heat removal occurs in the present or any other size or design of mold 11. This may be done without having to convert to other parameters before using QA as is required of the prior art mentioned above for using the QL record. In addition, the normalized QA record may also be used to make direct comparisons between molds as described above for the QL record.

Figure 3:
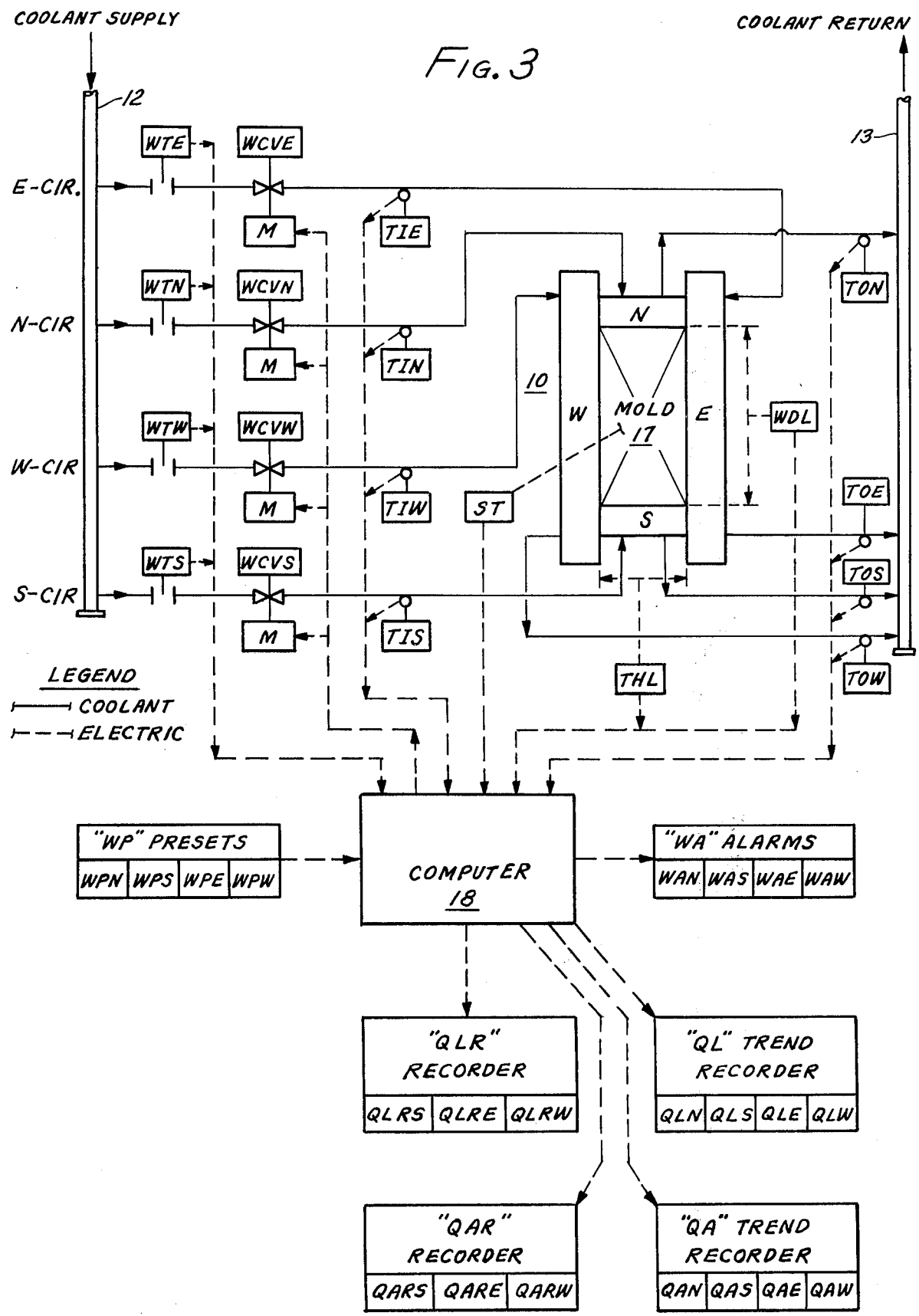
FIG. 3 is a piping and instrumentation diagram showing the present invention embodied in a four-circuit caster mold variable cooling system having an adjustable mold depicted in plan view.

Reference will now be made to FIG. 3 where the method and apparatus embodiments of the present invention are shown in continuous metal caster 10 having an adjustable mold 17. Adjustable size molds facilitate greater versatility and production economies in large-size continuous metal casters than do fixed size molds. For example, one adjustable-size mold may provide up to fourteen or more different standard size cast strands before requiring a mold change. However, adjustable size mold 17 has a plurality of separately cooled mold faces, each generally having an independently controlled cooling system, instead of a plurality of mold faces having one simplified cooling system as do some fixed-size molds.

For purposes of illustration, adjustable-size mold 17 has four faces designated N (North), S (South), E (East) and W (West). N and S faces are adjusted within the E and W faces and establish the width of cast strand 15. N and S faces of different lengths are interchangeable with each other and establish the thickness of cast strand 15. Mold 17 width and thickness signals are produced by corresponding transducers WDL and THL and are combined in computer 18 to determine mold face length as described below. Transducer WDL and THL may consist of thumbwheel switches preset by the operator of caster 10 before a cast. These transducers may also be position transmitters linked to mold face dimensions or movements and therefore function independently of the caster operator.

Each of the adjustable mold 17 faces have cooling passageways (not shown) which are connected to corresponding cooling circuits designated N-, S-, E- and W- circuits. Each cooling circuit is connected between coolant inlet and outlet manifolds 12 and 13, respectively. Each cooling circuit is instrumented substantially the same as is shown in FIG. 2 and described above with one exception. The exception being that additional ratioing circuitry is provided to produce the third and fourth new thermal parameter signals QLR and QAR, if desired. In other words, each cooling circuit includes a coolant flow rate transmitter WT; a desired coolant flow rate preset device WP; coolant flow control value WC; coolant inlet and outlet temperature sensors TI and TO; computer and control components in computer 18 which are associated with the foregoing devices; a flow alarm device WA; and a recording channel on multi-channel recorders QL and QA and QLR and QAR recorders.

Figure 4:
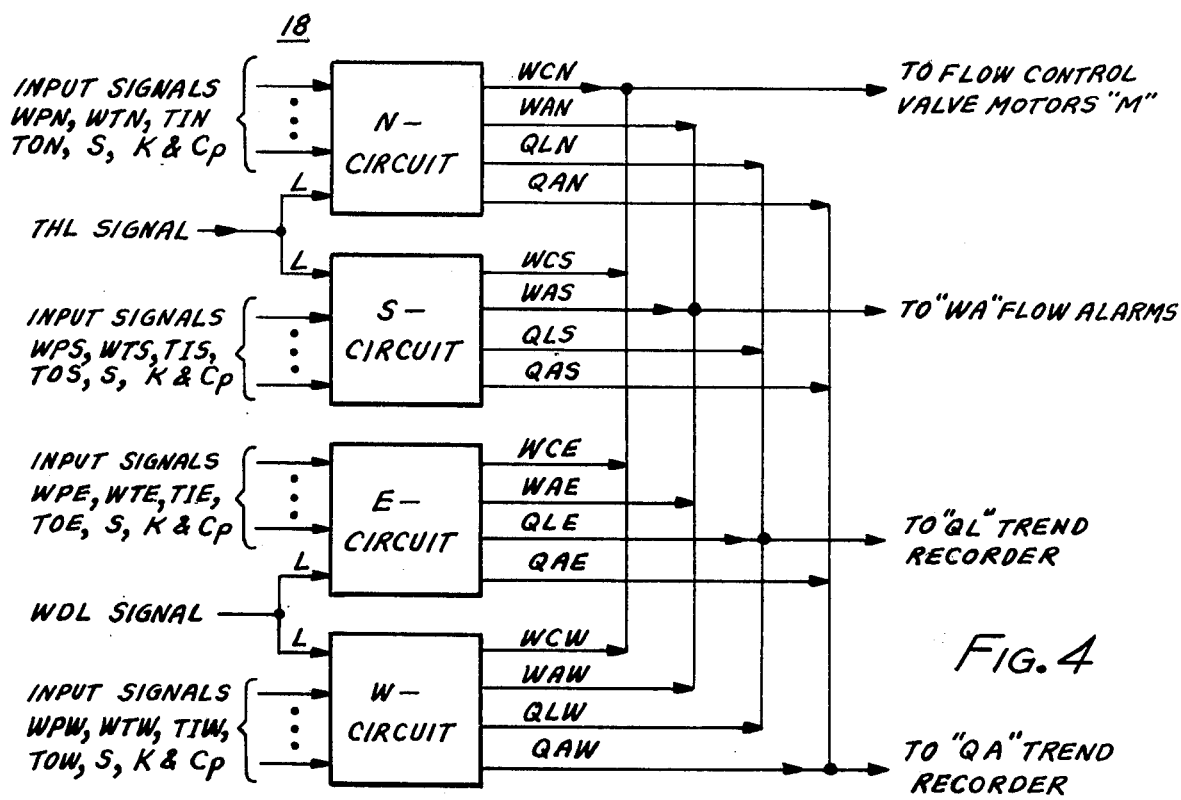
FIG. 4 is an instrumentation diagram showing the computer arrangement for the four-circuit caster mold cooling system illustrated in FIG. 3.
Figure 5:
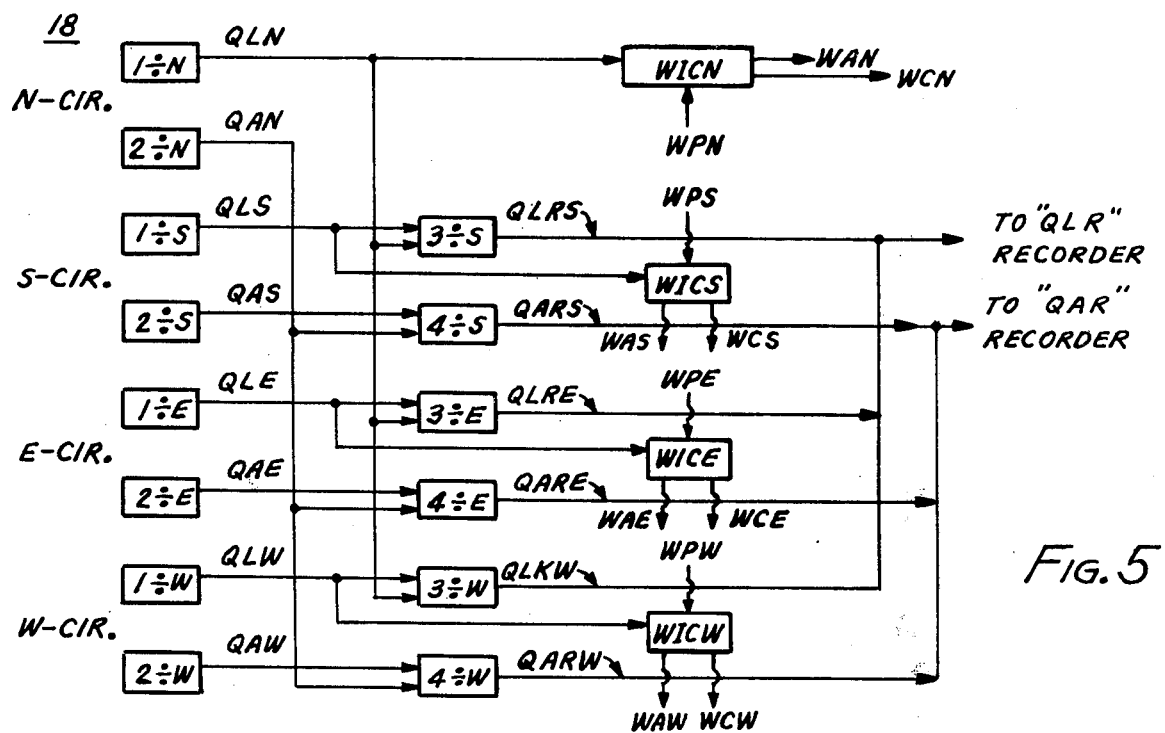
FIG. 5 is an instrumentation diagram showing thermal parameter ratioing modification of the computer depicted in FIG. 4.

Each component in each cooling circuit shown in FIG. 3, as well as in FIGS. 4 and 5, carries a suffix designation N, S, E or W corresponding to the individual cooling circuit. For example, the coolant flow rate transmitter in the N- circuit is identified as WTN. The only exception to this rule of identification is when the same signal such as caster speed S and constants K and Cp are fed to all four cooling circuits, or when the WDL and THL signals are each fed to pairs of cooling circuits as described below. Otherwise, all components associated with a given cooling circuit are identified with the corresponding suffix.

All of the WT, TI and TO sensor signals and the WP preset signal for each of the N-, S-, E- and W- cooling circuits, together with the S, WDL and THL signals, are fed to computer 18. Computer 18, which is diagrammed in FIG. 4, assimilates these signals in four separate data processing circuits identified as the N-, S-, E- and W- circuits. Each data processing circuit is capable of solving Equations 1 and 2 and consists essentially of the computer 14 shown in FIG. 2 with three exceptions noted below. Preset device WP is set in a conventional manner.

Regarding the first exception, there is only one caster speed signal S. This is fed from external speed transmitter ST into computer 18 and is applied to all four data processing circuits, as opposed to only one circuit in computer 14. Second, computer 18 has only one each adjustable constant signal source K and Cp which is fed to all four data processing circuits instead of four each of such supplies as might be inferred from FIG. 2. The THL thickness signal is fed only to the N-and S- data processing circuits; and the WDL width signal is fed only to the E- and W- data processing circuits. Thus, the entire length around the periphery of adjustable mold 17 is accounted for by THL and WDL signals.

With the foregoing in mind, the N- circuit in computer 18 processes the WPN, WTN, TIN, TON, THL, S, K and Cp signals, as described above in connection with computer 14, and produces WCN, WAN, QLN and QAN output signals. The S- circuit processes the WPS, WTS, TIS, TOS, THL, S, K and Cp signals and similarly produces WCS, WAS, QLS and QAS output signals. The E- circuit processes the WPE, WTE, TIE, TOE, WDL, S, K and Cp signals and similarly produces WCE, WAE, QLE and QAE output signals. Finally, the W- circuit processes the WPW, WTW, TIW, TOW, WDL, S, K and Cp signals and similarly produces WCW, WAW, QLW and QAW output signals.

A summary of computer 18 operation follows. Each of the calculated WCN, WCS, WCE and WCW flow control signals are fed to their respective motor operators "M" on corresponding flow control valves WCVN, WCVS, WCVE and WCVW. Each N-, S-, E- and W- cooling circuit operates independently of each other with respect to coolant flow rate W and WP signals. The new thermal parameter signals QL, QA, QLR and QAR and their recording circuits operate simultaneously and in unison with respect to the caster speed signal S and preset constant K and Cp input signals. Caster speed signal S is preset before a cast starts but may vary during the cast. Further, only the N- and S- cooling recording circuits operate simultaneously and in unison with respect to the thickness parameter THL as do the E- and W- cooling recording circuits with respect to width parameter WDL. Thus, the total "L" parameter is actually obtained from the sum of two THL and two WDL signals. The output signals WAN, WAS, WAE and WAW are fed to WA Flow Alarms shown in FIG. 3 and operate the same as in computer 14 described above.

Turning now to FIG. 5, there is shown modifications to computer 18 for producing the two other new thermal parameters QLR and QAR. These modifications compute the new QL and QA signals in ratio form by using one of mold 17 faces as a base against which the other three faces are ratioed. In actual practice, the N-face of mold 17 exemplifies the base against which the S-, E- and W- faces are ratioed. In this example, only the corresponding S-, E- and W- data processing circuits are modified in computer 18. The N- data processing circuit remains unchanged and operates the same as described above.

Before proceeding with the description of computer 18 modifications, it should be remembered from the description above that in the N-, S-, E- and W- data processing circuits the WN, WS, WE and WW flow rate signals are connected to the summing junction inputs of flow indicating controllers WICN, WICS, WICE and WICW. Here the WT flow rate feedback signals are combined with their respective flow rate preset signals WPN, WPS, WPE and WPW to produce variable flow control signals WCN, WCS, WCE and WCW. The WC flow control signals operate on respective control valve motors "M" on flow control valves WCVN, WCVS, WCVE and WCVW to establish and maintain a desired coolant flow rate in the N-, S-, E- and W- cooling circuits of adjustable mold 17. Whenever any of the actual coolant flow rates deviate from predetermined high- and low-flow rate limits in any of the mold cooling circuits, the WIC's involved produce a corresponding flow alarm signal WAN, WAS, WAE, or WAW. These WA flow signals are fed to the WA Flow Alarm Indicator shown in FIG. 3.

Computer 18 ratioing modifications include the addition of dividers $3\div S$, $3\div E$ and $3\div W$ for dividing the respective QL signal outputs from dividers $1\div S$, $1\div E$ and $1\div W$ by the base QLN signal from $1\div N$, thereby producing QLRS, QLRE and QLRW signals, respectively. Each of these signals are fed to separate channels on the QLR Recorder shown in FIG. 3. Alternatively, these signals may also be fed to an analyzer or data logger (neither shown) for after-the-cast analysis.

Additional ratioing modifications of computer 18 include incorporating dividers $4\div S$, $4\div E$ and $4\div W$ for dividing the respective QA signal outputs from dividers $2\div S$, $2\div E$ and $2\div W$ by the base QAN signal from $2\div N$ to produce QARS, QARE and QARW signals, respectively. Each of these signals are fed to separate channels on the QAR Recorder also shown in FIG. 3. Alternatively, these signals may also be fed to an analyzer or data logger (neither shown) for after-the-cast analysis.

The operator of caster 10 observes the record of the QLR and QAR Recorders and compares the particular trace of each of the corresponding signals with desired traces of ratios of heat removal rate per unit length of mold face and specific heat removal assigned thereto for the particular set of operating conditions at hand. For uniform heat removal distribution in the faces of mold 17, all three ratios of QLR signals and QAR signals should be 1.0. When heat removal distribution is not uniform to meet differing mold face requirements, then the ratio of a corresponding one or more QLR signal(S) and QAR signal(s) will be either greater or less than 1.0.

CASTER SPRAY COOLING AND ROLLER COOLING

Based on the above description of new thermal parameters QL, QA, QLR and QAR being used to determine heat removal in the partial solidification of molten metal in continuous caster mold 11, it will now be apparent to ordinary artisans that the same principles may be used to complete the solidification process in the spray cooling and roller cooling portions of the caster. Although these well known portions of the caster are not shown in FIG. 1, they have been omitted only for purposes of clarity in disclosing the more critical heat removal from the mold portion of caster 10.

It is also well known that the spray cooling and roller cooling portions of caster 10 each have a plurality of flow-controlled coolant zones for removing the proper amount of heat from cast strand 15 so as to complete the solidification process. Further, that each of these cooling zones is frequently instrumented with a coolant flow controller and a flow control valve which operate in a coolant flow control loop in response to coolant flow rate and temperature differential signals. This is substantially like the conventional W, WP, $\Delta T$, WIC, WC and WCV control loop portions in each of the multiple flow-circuits of the adjustable mold embodiment shown in FIG. 3. However, each of the spray cooling and roller cooling zones lack length L and caster speed S factors which are included in determining the new thermal parameters of the present invention.

The present invention may be utilized in spray cooling and roller cooling zones by modifying computer 18 to use just the WDL strand width signal in each such zone in place of different length L signals noted above for the mold flow circuits. Thus, all of the heat removal rate and specific heat removal calculations to determine QL and QA for each zone in the spray cooling and the roller cooling portions of caster 10 will now be normalized. That is, the heat removed from any width strand may now be directly compared with any other width strand without requiring additional calculations or data manipulation. Further, ratioing of the QL and QA signals to obtain the other new thermal parameter signs QLR and QAR will prove advantageous in comparing the heat removed from strand 15 in a base cooling zone to the other cooling zones.

Signals representing the new thermal parameters QL, QA, QLR and/or QAR for the spray cooling and roller cooling zones may be recorded in respective trend recorders as is described above for the mold cooling systems. The caster operator may observe their traces and compare them with desired traces of heat removal rate per unit width of strand and specific heat removal assigned thereto for the present set of known operating conditions.

We claim:

1. In a continuous metal caster having plural solidification means for casting a single strand, each said means having a coolant flowing therethrough, a method of determining at least one thermal parameter associated with each said solidification means, which method comprises:
   a. measuring coolant flow rate and coolant temperature in and out of at least one solidification means,
   b. determining a length parameter associated with at least one solidification means used to solidify metal into a moving cast strand, and
   c. determining heat removal rate per unit length of at least one solidification means as a function of said means coolant and length parameters.

2. The method of claim 1 wherein one solidification means is a mold and step (b) determines the peripheral length of the mold face as the length parameter.

3. The method of claim 1 wherein the length parameter determined by step (b) is strand width in at least one solidification means.

4. The method of claim 1 further including the step of:
   d. recording or analyzing heat removal rate per unit length parameter.

5. The method of claim 1 further including the steps of:
   e. measuring the speed of the moving cast strand, and
   f. determining specific heat removal of at least one solidification means as a function of moving strand speed and said heat removal rate per unit length parameters.

6. The method of claim 5 wherein one solidification means is a mold and step (f) determines mold specific heat removal and the heat removal rate per unit length is based on the peripheral length of the mold face.

7. The method of claim 5 wherein the length parameter used in step (f) to determine specific heat removal is based on strand width in at least one solidification means.

8. The method of claim 5 further including the step of:
   g. recording or analyzing the specific heat removal parameter.

9. In a continuous metal caster having an adjustable solidification mold with coolant flowing independently through plural faces of the mold, a method of determining at least one thermal parameter for each mold face which comprises:
   a. measuring each mold face coolant flow rate and coolant temperatures in and out of the mold face,
   b. determining each mold face peripheral length in terms of either one of two dimensions of the mold faces used to solidify metal into a moving cast strand, and
   c. determining mold heat removal rate per unit length of each mold face as a function of said mold coolant parameters and one of the two mold face length dimensions.

10. The method of claim 9 further including the step of:
    d. ratioing the mold heat removal rate per unit length of a base mold face with each of the other mold faces.

11. The method of claim 9 further including the steps of:
   e. measuring the speed of the moving cast strand, and
   f. determining specific heat removal for each mold face as a function of the moving strand speed parameter for each mold face and one of two mold heat removal rates per unit length of corresponding mold face parameters.

12. The method of claim 11 further including the step of:
   g. ratioing the mold specific heat removal of a base mold face with each of the other mold faces.

13. In a continuous metal caster having plural solidification means for casting a single strand, each said means having a coolant flowing therethrough, apparatus for determining at least one thermal parameter associated with each said solidification means, which apparatus comprises:
   a. plural means for measuring coolant flow rate and coolant temperature in and out of at least one solidification means,
   b. means for determining a length parameter associated with at least one solidification means used to solidify metal into a moving cast strand, and
   c. computing means for determining heat removal rate per unit length of at least one solidification means as a function of said means coolant and length parameters.

14. The apparatus of claim 13 wherein one solidification means is a mold and means (b) determines the peripheral length of the mold face as the length parameter.

15. The apparatus of claim 13 wherein the length parameter determined by means (b) is strand width in at least one solidification means.

16. The apparatus of claim 13 further including:
   d. means for recording or analyzing the heat removal rate per unit length parameter.

17. The apparatus of claim 13 further including:
   e. means for measuring the speed of the moving cast strand, and
   f. means included in the computing means for determining specific heat removal of at least one solidification means as a function of moving strand speed and heat removal rate per unit length parameters.

18. The apparatus of claim 17 wherein one solidification means is a mold and means (f) determines mold specific heat removal and the heat removal rate per unit length is based on the peripheral length of the mold face.

19. The apparatus of claim 17 wherein the length parameter used in means (f) to determine specific heat removal is based on strand width in at least one solidification means.

20. The apparatus of claim 16 further including:
   g. means for recording or analyzing the specific heat removal parameter.

21. In a continuous metal caster having an adjustable solidification mold with coolant flowing independently through plural faces of the mold, apparatus for determining at least one thermal parameter for each mold face, comprising:
   a. plural means for measuring each mold face coolant flow rate and coolant temperatures in and out of the mold face,
   b. means for measuring each mold face peripheral length in terms of either one of two dimensions of the mold faces used to solidify metal into a moving cast strand, and
   c. computing means for determining mold heat removal rate per unit length of each mold face as a function of said mold coolant parameters and one of the two mold face length dimensions.

22. The apparatus of claim 21 further including:
   d. means included in the computing means for ratioing the mold heat removal rate per unit length of a base mold face with each of the other mold faces.

23. The apparatus of claim 21 further including:
   e. means for measuring the speed of the moving cast strand, and
   f. means included in the computing means for determining specific heat removal for each mold face as a function of the moving strand speed parameter for each mold face and one of two mold heat removal rates per unit length of corresponding mold face parameters.

24. The apparatus of claim 23 further including:
   g. means included in the computing means for ratioing the mold specific heat removal of a base mold face with each of the other mold faces.

* * * * *